US012571294B2

(12) United States Patent
Williams et al.

(10) Patent No.: US 12,571,294 B2
(45) Date of Patent: *Mar. 10, 2026

(54) METHODS TO EVACUATE VARIOUS HYDROCARBON FLUIDS FROM UNDERGROUND STORAGE CONTAINMENT LOCATIONS USING CROSS-COMPRESSION TECHNIQUE

(71) Applicant: ZENRG Services, LLC, Houston, TX (US)

(72) Inventors: Ronald Williams, Houston, TX (US); Sam Edwards, Houston, TX (US); Joe Chandler, Houston, TX (US); Cameron Brasier, Spring, TX (US)

(73) Assignee: ZENRG SERVICES, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/600,746

(22) Filed: Mar. 10, 2024

(65) Prior Publication Data

US 2024/0301783 A1 Sep. 12, 2024

Related U.S. Application Data

(60) Provisional application No. 63/451,582, filed on Mar. 11, 2023.

(51) Int. Cl.
*E21B 43/34* (2006.01)
*C09K 8/58* (2006.01)
*E21B 43/12* (2006.01)

(52) U.S. Cl.
CPC .............. *E21B 43/34* (2013.01); *C09K 8/58* (2013.01); *E21B 43/121* (2013.01)

(58) Field of Classification Search
CPC .......... E21B 43/34; E21B 43/121; C09K 8/58
See application file for complete search history.

(56) References Cited

U.S. PATENT DOCUMENTS

| | | | | |
|---|---|---|---|---|
| 11,655,696 B1 * | 5/2023 | Gould | .................... | B63B 43/00 |
| | | | | 175/7 |
| 2004/0011748 A1 * | 1/2004 | Amado | .............. | B01D 17/0208 |
| | | | | 210/800 |

(Continued)

FOREIGN PATENT DOCUMENTS

WO WO-2017181264 A1 * 10/2017 ............. C09K 8/524

*Primary Examiner* — Silvana C Runyan
(74) *Attorney, Agent, or Firm* — Mintz, Levin, Cohn, Ferris, Govsky, Popeo, P.C.

(57) ABSTRACT

A method to evacuate a fluid mixture from an underground storage location with the use or regulation control of cross-compression technique. The method allows to evacuate and recover a fluid mixture from an underground storage location. The fluid mixture typically contains a hydrocarbon fluid phase and a brine phase. The method includes separating the fluid mixture in the hydrocarbon fluid phase and the brine phase, inside the separation vessel, and then alternatively pumping each phase of the fluid mixture contained inside the separation vessel towards dedicated containment volumes, using a single pump or multiple pumps, whereby a first containment volume is dedicated to the hydrocarbon fluid phase and a second containment volume is dedicated to the brine phase. The proposed method allows recovering a higher proportion of the fluid mixture, as recycled product, and therefore limiting the combustion or release of hydrocarbon towards the atmosphere.

14 Claims, 6 Drawing Sheets

(56) References Cited

U.S. PATENT DOCUMENTS

| | | | |
|---|---|---|---|
| 2015/0167444 A1* | 6/2015 | Grande | .................. E21B 43/40 |
| | | | 166/57 |
| 2020/0308962 A1* | 10/2020 | Allouche | ................. G01N 1/14 |

* cited by examiner ( START )

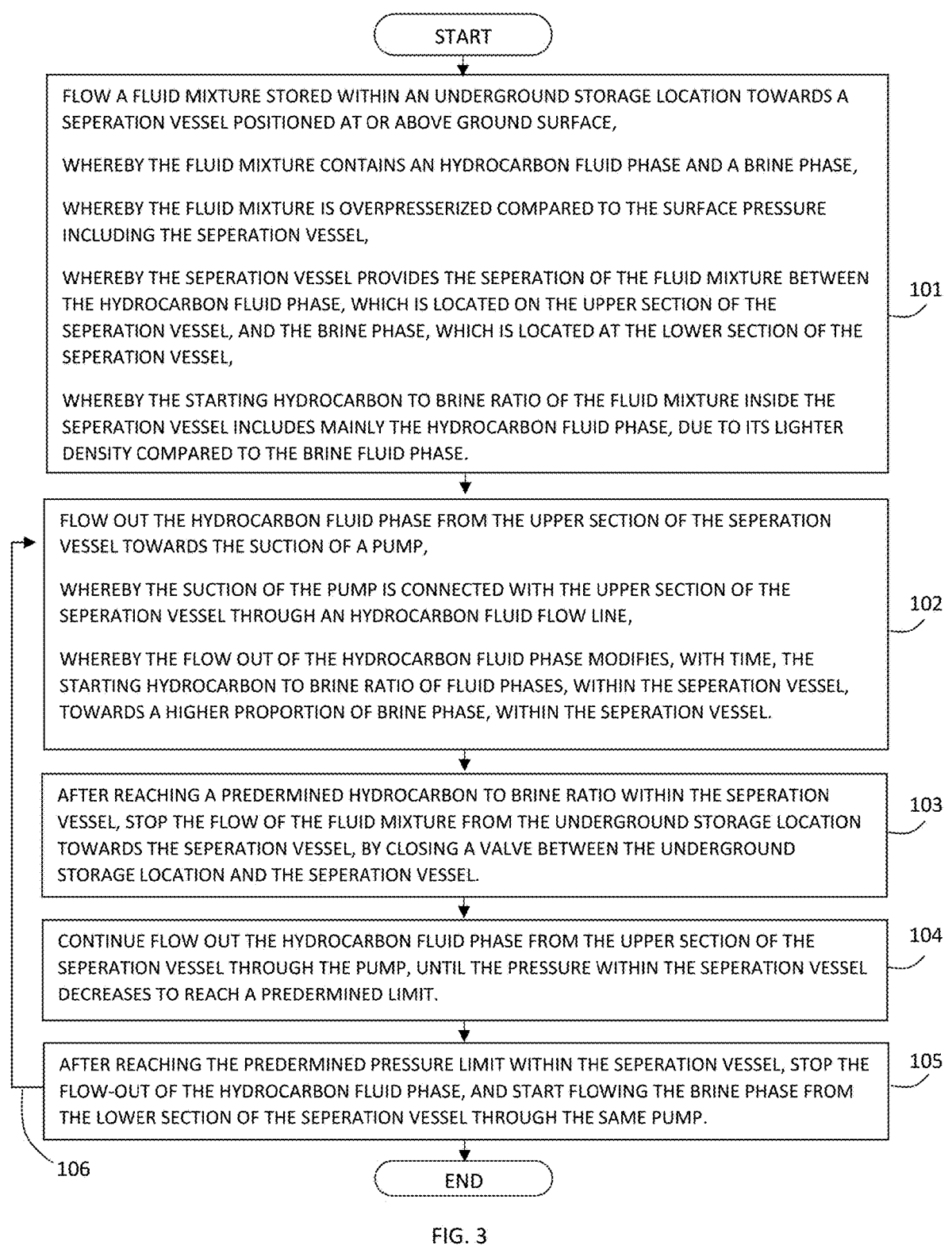

FLOW A FLUID MIXTURE STORED WITHIN AN UNDERGROUND STORAGE LOCATION TOWARDS A SEPERATION VESSEL POSITIONED AT OR ABOVE GROUND SURFACE,

WHEREBY THE FLUID MIXTURE CONTAINS AN HYDROCARBON FLUID PHASE AND A BRINE PHASE,

WHEREBY THE FLUID MIXTURE IS OVERPRESSERIZED COMPARED TO THE SURFACE PRESSURE INCLUDING THE SEPERATION VESSEL,

WHEREBY THE SEPERATION VESSEL PROVIDES THE SEPERATION OF THE FLUID MIXTURE BETWEEN THE HYDROCARBON FLUID PHASE, WHICH IS LOCATED ON THE UPPER SECTION OF THE SEPERATION VESSEL, AND THE BRINE PHASE, WHICH IS LOCATED AT THE LOWER SECTION OF THE SEPERATION VESSEL,

WHEREBY THE STARTING HYDROCARBON TO BRINE RATIO OF THE FLUID MIXTURE INSIDE THE SEPERATION VESSEL INCLUDES MAINLY THE HYDROCARBON FLUID PHASE, DUE TO ITS LIGHTER DENSITY COMPARED TO THE BRINE FLUID PHASE.

101

FLOW OUT THE HYDROCARBON FLUID PHASE FROM THE UPPER SECTION OF THE SEPERATION VESSEL TOWARDS THE SUCTION OF A PUMP,

WHEREBY THE SUCTION OF THE PUMP IS CONNECTED WITH THE UPPER SECTION OF THE SEPERATION VESSEL THROUGH AN HYDROCARBON FLUID FLOW LINE,

WHEREBY THE FLOW OUT OF THE HYDROCARBON FLUID PHASE MODIFIES, WITH TIME, THE STARTING HYDROCARBON TO BRINE RATIO OF FLUID PHASES, WITHIN THE SEPERATION VESSEL, TOWARDS A HIGHER PROPORTION OF BRINE PHASE, WITHIN THE SEPERATION VESSEL.

102

AFTER REACHING A PREDERMINED HYDROCARBON TO BRINE RATIO WITHIN THE SEPERATION VESSEL, STOP THE FLOW OF THE FLUID MIXTURE FROM THE UNDERGROUND STORAGE LOCATION TOWARDS THE SEPERATION VESSEL, BY CLOSING A VALVE BETWEEN THE UNDERGROUND STORAGE LOCATION AND THE SEPERATION VESSEL.

103

CONTINUE FLOW OUT THE HYDROCARBON FLUID PHASE FROM THE UPPER SECTION OF THE SEPERATION VESSEL THROUGH THE PUMP, UNTIL THE PRESSURE WITHIN THE SEPERATION VESSEL DECREASES TO REACH A PREDERMINED LIMIT.

104

AFTER REACHING THE PREDERMINED PRESSURE LIMIT WITHIN THE SEPERATION VESSEL, STOP THE FLOW-OUT OF THE HYDROCARBON FLUID PHASE, AND START FLOWING THE BRINE PHASE FROM THE LOWER SECTION OF THE SEPERATION VESSEL THROUGH THE SAME PUMP.

105

106

( END )

FIG. 3

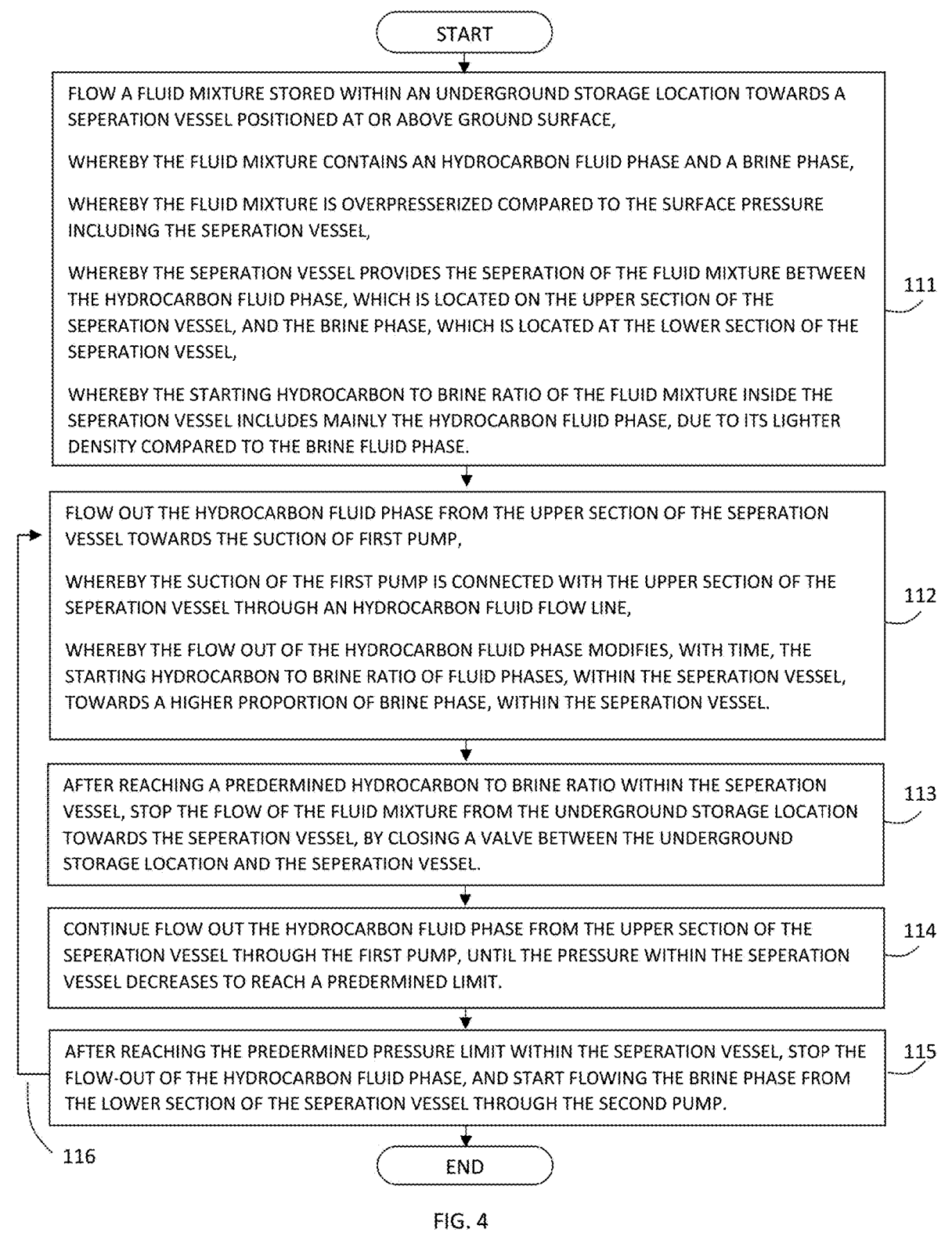

START

FLOW A FLUID MIXTURE STORED WITHIN AN UNDERGROUND STORAGE LOCATION TOWARDS A SEPERATION VESSEL POSITIONED AT OR ABOVE GROUND SURFACE,

WHEREBY THE FLUID MIXTURE CONTAINS AN HYDROCARBON FLUID PHASE AND A BRINE PHASE,

WHEREBY THE FLUID MIXTURE IS OVERPRESSERIZED COMPARED TO THE SURFACE PRESSURE INCLUDING THE SEPERATION VESSEL,

WHEREBY THE SEPERATION VESSEL PROVIDES THE SEPERATION OF THE FLUID MIXTURE BETWEEN THE HYDROCARBON FLUID PHASE, WHICH IS LOCATED ON THE UPPER SECTION OF THE SEPERATION VESSEL, AND THE BRINE PHASE, WHICH IS LOCATED AT THE LOWER SECTION OF THE SEPERATION VESSEL,

WHEREBY THE STARTING HYDROCARBON TO BRINE RATIO OF THE FLUID MIXTURE INSIDE THE SEPERATION VESSEL INCLUDES MAINLY THE HYDROCARBON FLUID PHASE, DUE TO ITS LIGHTER DENSITY COMPARED TO THE BRINE FLUID PHASE.

111

FLOW OUT THE HYDROCARBON FLUID PHASE FROM THE UPPER SECTION OF THE SEPERATION VESSEL TOWARDS THE SUCTION OF FIRST PUMP,

WHEREBY THE SUCTION OF THE FIRST PUMP IS CONNECTED WITH THE UPPER SECTION OF THE SEPERATION VESSEL THROUGH AN HYDROCARBON FLUID FLOW LINE,

WHEREBY THE FLOW OUT OF THE HYDROCARBON FLUID PHASE MODIFIES, WITH TIME, THE STARTING HYDROCARBON TO BRINE RATIO OF FLUID PHASES, WITHIN THE SEPERATION VESSEL, TOWARDS A HIGHER PROPORTION OF BRINE PHASE, WITHIN THE SEPERATION VESSEL.

112

AFTER REACHING A PREDERMINED HYDROCARBON TO BRINE RATIO WITHIN THE SEPERATION VESSEL, STOP THE FLOW OF THE FLUID MIXTURE FROM THE UNDERGROUND STORAGE LOCATION TOWARDS THE SEPERATION VESSEL, BY CLOSING A VALVE BETWEEN THE UNDERGROUND STORAGE LOCATION AND THE SEPERATION VESSEL.

113

CONTINUE FLOW OUT THE HYDROCARBON FLUID PHASE FROM THE UPPER SECTION OF THE SEPERATION VESSEL THROUGH THE FIRST PUMP, UNTIL THE PRESSURE WITHIN THE SEPERATION VESSEL DECREASES TO REACH A PREDERMINED LIMIT.

114

AFTER REACHING THE PREDERMINED PRESSURE LIMIT WITHIN THE SEPERATION VESSEL, STOP THE FLOW-OUT OF THE HYDROCARBON FLUID PHASE, AND START FLOWING THE BRINE PHASE FROM THE LOWER SECTION OF THE SEPERATION VESSEL THROUGH THE SECOND PUMP.

115

116

END

FIG. 4

METHODS TO EVACUATE VARIOUS HYDROCARBON FLUIDS FROM UNDERGROUND STORAGE CONTAINMENT LOCATIONS USING CROSS-COMPRESSION TECHNIQUE

BACKGROUND

The field of use includes the draw-down or de-inventory of underground storage containment locations, such as salt domes, bedded salt, depleted reservoirs, or other designated locations below the surface in the midstream sector. Typical underground storage may contain a mixture of fluids including hydrocarbon fluids, in a liquid or gas form, and brine. The hydrocarbon fluids themselves may include a mix of Liquefied Petroleum Gas, abbreviated as LPG, Highly Volatile Liquid, abbreviated as HVL, Highly Reactive Volatile Organic Compounds, abbreviated as HRVOC, Methane Gas, abbreviated as NG or PG, hydrogen, carbon dioxide, abbreviated as $CO2$, and various grades of oil or hydrocarbons abbreviated as HC.

The brine may be considered as a displacement media with a significantly heavier specific gravity than the hydrocarbon fluid. The brine may usually be a mixture of salt and water. The brine may also include other inert displacement media, as well as any intermediate phases between liquid and gas. Due to the difference in densities between the stored hydrocarbon fluids and water, there is separation between the two phases, with the lighter density hydrocarbon fluid layer being on top of the heavier density brine layer.

Underground storage may be in need of drawn down for various reasons, including routine maintenance for issues like inspections, valve replacement, corrosion or damage repair to the pipe or casing. Other needs may also include inspections such as pressure testing or cutting out stuck inline inspection tools, idling of underground storage facilities when not in use for long periods or abandonment at the end of its service life.

A typical existing method used to perform an underground storage draw-down or de-inventory operation is to use a flare stack designed to burn the evacuated fluids. During this process, the flare typically initially receives 100 percent of the hydrocarbon fluid being stored until the bulk of the hydrocarbon fluid has been removed. At this point the underground storage cavern will be mostly full of brine with just residuals of hydrocarbon fluid remaining entrained in the brine.

When using this existing method, all the hydrocarbon fluid in the underground storage cavern is treated as waste and consumed by the flare. Therefore, all value of the hydrocarbon fluid inside the underground storage cavern will be lost and the combustion of the entire volume of hydrocarbon fluid within the underground storage cavern may increase the amount of released emission in the atmosphere.

BRIEF DESCRIPTION OF THE DRAWINGS

For a more detailed description of the embodiments of the disclosure, reference will now be made to the accompanying drawings.

FIG. 3 represents a detailed method flowchart with the major steps of the invention linked to FIG. 1.

FIG. 4 represents a detailed method flowchart with the major steps of the invention linked to FIG. 2.

DETAILED DESCRIPTION

It is to be understood that the following disclosure describes several exemplary embodiments for implementing different features, structures, or functions of the invention. Exemplary embodiments of components, arrangements, and configurations are described below to simplify the disclosure; however, these exemplary embodiments are provided merely as examples and are not intended to limit the scope of the invention.

Even if advantages and other features will become apparent from the following schematics, description and proposed claims, the proposed list of advantages may be limiting.

The proposed invention process may use a combination of some elements of the two methods described in the existing art section, while adding specific usage, features and control method.

One advantage of the proposed invention would be to capture as much hydrocarbon fluid as practical from the drawdown underground storage cavern, while completing the draw down in the same or less time frame as a typical flaring operation would take. The proposed invention may therefore result in nearly 100 percent of hydrocarbon fluid recovery from the drawdown underground storage cavern, Overall, the proposed invention may improve both the financial and environmental aspects of the drawdown operation.

The following item numbers refer to the FIGS. 1 to 6, which are depicting the proposed invention.

Figure 1:
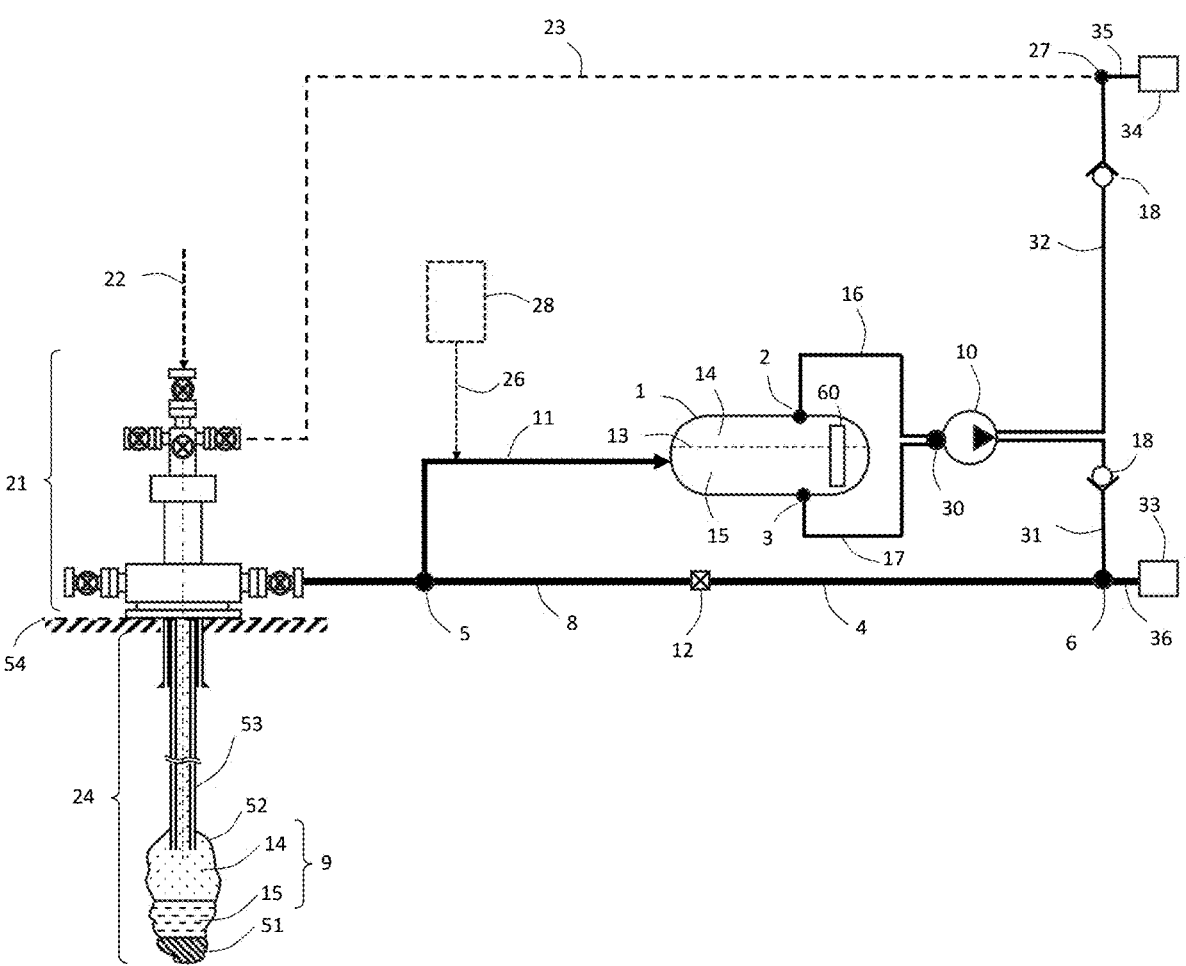
FIG. 1 represents a schematic of the components and connections related to the proposed invention.

As depicted in FIG. 1, the proposed invention process may include a separation vessel 1 inline between an underground storage 24, a draw-down pipe section 8 and a pump 10.

The underground storage 24 may typically be located below the ground level or surface level 54. Aboveground, a wellhead 21 with various valves and connections may link the underground storage 24 with the equipment located next to the ground level 54. The underground storage 24 may include a flow connection 53 which links the wellhead 21 with storage containment volume 52. The storage containment volume 52 may have the shape of a natural or artificial underground cavern, a fracked or boosted reservoir, a depleted reservoir, a salt dome, or other underground volumes which can be used to store various fluid mixtures 9 in gas or liquid form. The flow connection 53 may have the shape of a tubing or a casing, as represented in FIG. 1, or could be an open hole connection, as a drilled hole linking the surface to the underground volume. The flow connection 53 may be cemented, with multiple casing, tubing or liner layers. The flow connection 53 may be mainly vertical as represented in FIG. 1, though may also be deviated or may include horizontal sections. Some part of horizontal or deviated sections of the flow connection 53 may also be used as a portion of the storage containment volume 52. Additional storage possibility may include the volume between multiple casings or tubing, as an anulus volume. Typical storage containment volume 52 may include an enclosed volume limiting leakage or fluid passage through a volume enclosure. The volume enclosure may include metal, tight rocks, cement, salt dome and may be used to limit the leakage of the stored fluid mixture 9 passing beyond the storage containment volume 52. The stored fluid mixture 9 may typically include a hydrocarbon fluid phase 14 and a brine phase 15, including various mixtures in liquid or gas form, as described in the background description of this application specification. As represented in FIG. 1, the hydrocarbon fluid phase 14 may have a lower density than the brine phase 15, and therefore the hydrocarbon fluid phase 14 may be located above the brine phase 15. Heavier particles 51 may also be present at the bottom volume of the underground storage 24. Heavier particles 51 may include solid debris from drilling cuttings, completion bi-products, sand, proppant or saturated salts and chemicals.

The storage containment volume 52 would be the section to de-inventory or draw down. Typically, as the fluid mixture 9 is pumped and stored from surface, the fluid mixture 9 may be over-pressured compared to the surface pressure, plus the hydrostatic pressure from the fluid column depth. The over-pressure of the fluid mixture 9 allows to proceed with fluid recovery as decided and planned. The wellhead 21 may include a Christmas Tree, as represented in FIG. 1, with multiple valves and connections. The wellhead 21 may allow to contain the over-pressure of the fluid mixture 9 as needed. The wellhead 21 may also allow connecting external line such as a brine injection line 22 or an adjacent brine return line 23. The brine injection line 22 may allow to inject brine fluid inside the underground storage 24 and adjust the fluid proportion stored in the underground storage, as well as adjust the pressure of the fluid mixture 9 within the storage containment volume 52.

A drawdown section 8 may be linked to one of the connections of the wellhead 21. The drawdown section may allow flowing the fluid mixture 9 from the underground storage 24 towards further equipment located above surface level 54. From the drawdown section 8, a flowline 11 may link a drawdown section connection 5 to the separation vessel 1. The drawdown section connection 5 may be a tie-in point on the pipeline of the drawdown section 8 allowing flowing the fluids 9 inside the flow line 11.

The separation vessel 1, also designated as knock-out tank, or gas buster, or slug catcher, or trap tank, may have the shape of a barrel or tank, either in a vertical position or horizontal position. The separation vessel 1 would typically include a feed-in connection, with flow line 11. The typical function of the separation vessel 1 would be to separate the brine phase 15 from the hydrocarbon fluid phase 14 within the vessel. A brine to hydrocarbon fluid level within the separator vessel would be symbolized as level 13. Different types of separation vessel 1 could be used, such as mechanical, gravity or centrifugal. The usage, shape and types of separation vessel 1 could depend on the fluid mixture 9, on the proportion of fluid versus gas to be separated, the type of fluid or gas such as the expansion ratio between liquid and gas, the quantities of mixture being separated, the time and capacity of operation, the environment parameters such as pressure and temperature.

The separation vessel 1 may have two output connections, a vessel top connection 2 and a vessel bottom connection 3. The vessel top connection 2 allows to flow the hydrocarbon fluid phase 14 from the upper section of the separation vessel 1. The vessel bottom connection 3 allows to flow the brine phase 15 from the upper section of the separation vessel 1. After flowing through the vessel top connection 2, the hydrocarbon fluid phase 14 may flow through a hydrocarbon fluid flow line 16 towards a pump suction inlet connection 30. After flowing through the vessel bottom connection 3, the brine phase 15 may flow through a brine flow line 17 towards the pump suction inlet connection 30. Depending on the opening/closing position of the vessel top connection 2 versus the position of the vessel bottom connection 3 as well as of the pump suction inlet connection 30, the pump 10 may flow either fluid of the fluid mixture 9 out of the separation vessel 1. The pump 10 may therefore flow either the hydrocarbon fluid phase 14 or the brine phase 15, out of the separation vessel 1. A possibility for specific operations may be that both fluid phases 14 and 15 are pumped simultaneously through the pump 10.

The pump 10 may transport out the hydrocarbon fluid phase 14 towards a hydrocarbon fluid output flowline 31. Typically, with the vessel top connection 2 open, and the pump suction inlet connection 30 directed to take fluid flow from the hydrocarbon fluid flowline 16, the pump 10 may flow out most of the fluid towards the hydrocarbon fluid output flowline 31. While the hydrocarbon fluid phase 14 is flowing through the flow lines 16 and 31, the vessel bottom connection 3 may be closed and no brine phase 15 may be flown simultaneously. As represented on FIG. 1, the pump 10 may have multiple suction and output valve connections allowing to flow either the hydrocarbon fluid phase 14 or the brine phase 15, while preventing the mixing of both fluids. One advantage of the application invention may be to separate and isolate as much as possible of each fluid phases 14 or 15 from each other's, and therefore allow recovering and valuing separately most of each phase.

Alternatively, the pump 10 may transport out the brine phase 15 towards a brine output flowline 32. Typically, with the vessel bottom connection 3 open, and the pump suction inlet connection 30 directed to take fluid flow from the brine flowline 17, the pump 10 may flow out most of the fluid towards the brine output flowline 32. While the brine phase 15 is flowing through the flow lines 17 and 32, the vessel top connection 2 may be closed and no hydrocarbon fluid phase 14 may be flown simultaneously.

The pump 10 may be operated manually, remotely, or automated. The pump 10 may function through pneumatic, pressure, electrical, mechanical, or other hydraulic means. The type of the pump 10 may include a piston pump, a screw pump, a diaphragm pump, a centrifugal pump, a gear pump, a lobe pump, a metering pump, a progressive cavity pump, a plunger pump or multi-phase pump or compressor. The pump 10 would typically displace in a range from 0 to 250 thousand scf/hour, as standard cubic feet of gas per hour [0 to 7,000 cubic meters per hour] or 1 to 3 barrels per minute of liquid [0.16 to 0.5 cubic meter per minute].

The brine output flowline 32 may connect to an adjoining brine section connection valve 27. The adjoining brine section connection valve 27 may be a multi-port valve or a combination of multiple valves, allowing connecting or isolating multiple fluid flowing output. As represented in FIG. 1, the adjoining brine section connection valve 27 may connect the brine output flowline 32 with the adjacent brine return line 23 and a brine return flowline 35. The brine return flowline 35 may itself be linked with a brine collection volume 34. The brine collection volume 34 may have the shape of a reservoir or a tank, as well as a pipeline connecting to an external network of brine collection volumes. The brine collection volume 34 may be movable, replaceable and may include some pumping, venting or flaring capacity. The brine collection volume 34 may be used to inject or re-circulate brine fluid 15, using the adjacent brine return line 23 towards the wellhead 21.

The hydrocarbon fluid output flowline 31 may connect to an adjoining hydrocarbon fluid section connection valve 6. The adjoining hydrocarbon fluid section connection valve 6 may be a multi-port valve or a combination of multiple valves, allowing connecting or isolating multiple fluid flowing output. As represented on FIG. 1, the adjoining hydrocarbon fluid section connection valve 6 may connect the hydrocarbon fluid output flowline 31 with an adjacent hydrocarbon fluid return line 4 and a hydrocarbon fluid return flowline 36. The adjacent hydrocarbon fluid return line 4 may be linked with the drawdown section 8 through a block valve 12. The block valve 12 may be closed during pumping and evacuating operation, therefore isolating the hydrocarbon fluid phase 14, contained within the adjacent hydrocarbon fluid return line 4, from the fluid mixture 9 contained within the drawdown section 8. The block valve 12 may be opened for example during hydrocarbon fluid injection operation, or pressure rebalance.

The hydrocarbon fluid return flowline 36 may itself be linked with a hydrocarbon fluid collection volume 33. The hydrocarbon fluid collection volume 33 may have the shape of a reservoir or a tank, as well as a pipeline connecting to an external network of hydrocarbon fluid collection volumes. The hydrocarbon fluid collection volume 33 may be movable, replaceable and may include some pumping, venting or flaring capacity. The hydrocarbon fluid collection volume 33 may be used to inject or re-circulate hydrocarbon fluid 14, using the adjacent hydrocarbon fluid return line 4 and the drawdown section 8, towards the wellhead 21.

Both the brine output flow line 32 and the hydrocarbon fluid output flowline 31 may include a check valve 18. The check valve 18 may have the shape of a ball check valve or anti-return flow valve. The check valve 18 may only allow passing the fluid towards one downstream direction and therefore may avoid any return of either hydrocarbon fluid phase 14 or brine fluid phase 15 back to the pump 10.

An injection of flush media may be added to the application process and is symbolized in FIG. 1 with a purge tank 28. The purge tank 28 may be filled with flush media such as fresh water, nitrogen, compressed gas, and may be linked to the flowline 11 through a flush connection 26. The purge tank 28 may for example allow commissioning the separation vessel 1 by removing any contaminates before operating the separation operation between the hydrocarbon fluid phase 14 and the brine fluid phase 15.

The operating sequence represented in FIG. 3 is an example of a method using the schematic described in FIG. 1.

Figure 2:
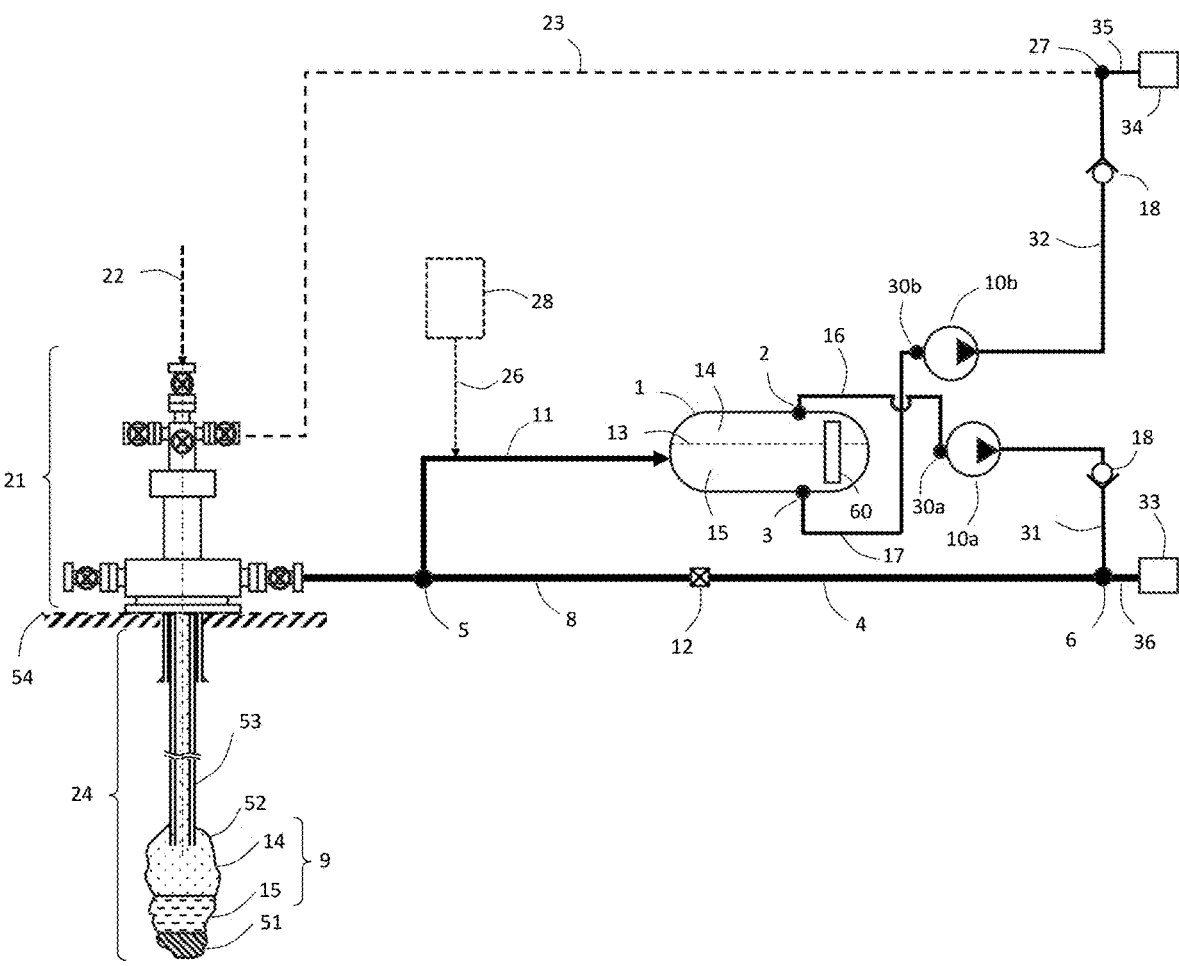
FIG. 2 represents a variation schematic to FIG. 1, with components and connections, represented with two pumps downstream from the separation vessel.

FIG. 2 represents a variation to FIG. 1 regarding the pump 10. Most items described within FIG. 1 are in common with FIG. 2. As a variation within FIG. 2, more than one pump 10 may be present. As a non-limiting example, FIG. 2 includes two pumps 10a and 10b. The pump 10a may be connected with the hydrocarbon fluid flowline 16, through a pump suction inlet connection 30a. The output of the pump 10a may be linked with the hydrocarbon fluid output flowline 31. The pump 10b may be connected with the brine flowline 17, through a pump suction inlet connection 30b. The output of the pump 10b may be linked with the brine output flowline 32. Therefore, the pump 10a may only be dedicated to the hydrocarbon fluid phase 14, while the pump 10b may only be dedicated to the brine phase 15. The two pumps 10a and 10b of FIG. 2 may fulfill similar functions as the single pump 10 of FIG. 1, with potentially leaner operation, with reduced changes in the valve positions.

Additional pumps may be incorporated in series or in parallel, while keeping a similar flow schematic as described in FIGS. 1 and 2.

FIG. 3 depicts a flowchart sequence method, related to the flow schematic described in FIG. 1.

As a first step 101, with starting the sequence method, the fluid mixture 9, stored within the underground storage location 24, will be flown towards the separation vessel 1, positioned at or above the ground surface 54. The fluid mixture 9 may include the hydrocarbon fluid phase 14 and the brine phase 15. The fluid mixture 9 is over pressurized within the storage containment volume 52 of the underground storage location 24, compared to the surface pressure. Typically, the pressure within the storage containment volume 52 may be between 500 psi and 10,000 psi [3.4 MPa and 68.9 MPa] depending on the type of storage, the depth of the storage containment volume 52 compared to the ground surface 54, the geometry of the storage containment volume 52, the fluid mixture 9 type and ratio, the natural or artificial pressure acting on the fluid mixture 9 contained within storage containment volume 52. Above ground surface 54, the pressure of the fluid mixture 9 may be between 30 psi and 5,000 psi [0.2 MPa to 34.5 MPa], allowing a positive displacement of the fluid mixture 9 from the underground storage location 24 towards the separation vessel 1. A decrease of fluid pressure between the underground storage location 24 and the separation vessel 1 may typically be caused by friction losses, gravity difference and the flow-through areas of the various flowlines and valves.

As also mentioned in step 101, the separation vessel 1 may provide the separation of the fluid mixture 9 between the hydrocarbon fluid phase 14 and the brine phase 15. Due to the fluid density difference, the hydrocarbon fluid phase 14 will be located on the upper section of the separation vessel 1, and the brine phase 15 will be located on the lower section of the separation vessel 1, as depicted in FIG. 1. Also related to the flow schematic of FIG. 1, the brine to hydrocarbon fluid level within the separation vessel 1, symbolized as level 13, represents the interface between the hydrocarbon fluid phase 14 on top and the brine phase 15 at the bottom. For operation practicality, a hydrocarbon to brine ratio may be introduced, whereby a value of 1 for the hydrocarbon to brine ratio corresponds to the volume of the separation vessel 100% filled with the hydrocarbon fluid phase 14. Furthermore, with the value of the hydrocarbon to brine ratio equaling 1, the volume of the separation vessel 1 will consequently be filled to 0% with the brine phase 15. A value of 0 for the hydrocarbon to brine ratio corresponds to the volume of the separation vessel 1 filled to 0% with the hydrocarbon fluid phase 14 and consequently to 100% with the brine phase 15. In the two extremes, 0 and 1 for the hydrocarbon to brine ratio, the interface level 13 may not be present within the separation vessel 1, as only one fluid phase is present.

As also mentioned in step 101, the hydrocarbon to brine ratio may be above 0.9 when starting flowing the fluid mixture 9 stored within the underground storage location 24 towards the separation vessel 1. At the start of flowing operation of the fluid mixture 9, while having an overpressure of the fluid mixture 9 within the separation vessel 1 at surface, of at least 30 psi [0.2 MPa], mostly the hydrocarbon fluid phase 14 may flow first, due to its lighter fluid density compared to the brine fluid 15.

In step 102, having the starting condition of the step 101, the hydrocarbon fluid phase 14 may be flown out of the separation vessel 1, using the vessel top connection 2. The displacement of the hydrocarbon fluid phase 14 may be induced by the pump 10, having the suction inlet connection 30 open to allow the displacement of the hydrocarbon fluid phase 14 through the hydrocarbon fluid flowline 16. The discharge of the pump 10 may be directed towards the hydrocarbon fluid output flowline 31 which may be linked to the adjacent hydrocarbon fluid return line 4 and a hydrocarbon fluid return flowline 36, through the adjoining hydrocarbon fluid section connection valve 6. Further, the hydrocarbon fluid phase 14 may be saved and separated within the hydrocarbon fluid phase collection volume 33. Through this step 102, the hydrocarbon fluid phase 14 may be valued and reused for future occasion, while being separated from the brine phase 15.

Also mentioned in step 102, the flow-out of the hydrocarbon fluid phase 14, from the separation vessel through the pump 10, may modify the starting hydrocarbon to brine ratio by decreasing it. The hydrocarbon to brine ratio may decrease with time as the fluid mixture entering and flowing through the separation vessel 1 will be a mix of both phases 14 and 15. Therefore, while flowing out nearly exclusively the hydrocarbon fluid phase 14 through the pump 10, the flow entry of the separation vessel 1 will include both phases 14 and 15, though the flowline 11. Furthermore, the hydrocarbon to brine ratio within the storage containment volume 52 may also evolve with time, as the least dense phase represented by the hydrocarbon fluid phase 14 may tend to decrease with time allowing a higher proportion of brine phase 15 to replace the hydrocarbon fluid phase 14.

Step 103 may be a continuation of step 102, whereby the hydrocarbon to brine ratio within the separation vessel will decrease with time to reach a value between 0.1 and 0.4. This means that the volume of the brine phase 15 represents between 60% and 90% of the whole volume of the separation vessel 1. When a predetermined hydrocarbon to brine ratio has been reached within the separation vessel, typically between 0.1 and 0.4, the operation continues by closing the valve of the drawdown section connection 5. Closing drawdown section connection 5 allows stopping the flow of fluid mixture 9 through the flowline 11.

Step 104 may be a continuation of step 103, by keeping the flow out of the hydrocarbon fluid phase 14 from the top connection 2 of the separation vessel 1 through the pump 10, until the pressure within the separation vessel 1 has decreased to reach a predetermined limit. The pressure limit may be set between 0 psi and 10 psi [0 MPa and 0.07 MPa]. Practically, it would mean that when reaching this pressure limit, the pressure is no more sufficient to displace the hydrocarbon fluid phase 14 from the top connection 2 of the separation vessel 1.

Step 105 may be a continuation of step 104, by stopping the flow-out of the hydrocarbon fluid phase 14 from the vessel top connection 2 towards the pump 10, when the pressure of the fluid mixture 9 within the separation vessel 1 has decreased to reach the pressure limit set between 0 psi and 10 psi [0 MPa and 0.07 MPa]. Practically, stopping the flow-out of the hydrocarbon fluid phase 14 from the vessel top connection 2 may occur by closing the vessel top connection 2 of the separation vessel 1. Furthermore, step 105 may include the start of flowing the brine phase 15 from the separation vessel bottom connection 3 towards the pump 10. The pump suction inlet connection 30 may be adjusted to switch the pump suction from the hydrocarbon fluid phase 14 through the flow line 16 towards the brine phase 15 through the flow line 17. In addition, to allow the discharge of the brine phase 15 through the brine output flowline 32, instead of the discharge of the hydrocarbon fluid phase 14 through the hydrocarbon fluid output flowline 31, the adjoining brine section connection valve 27 may be open while the adjoining hydrocarbon fluid section connection valve 6 may be closed. Therefore, the separation vessel 1 may be emptied from the remaining brine phase 15, which was left at the end of step 103 or 104.

Step 106 may be a back loop to repeat in sequence the steps 102, 103, 104 and 105 multiple times.

At any time during the sequence steps 102, 103, 104 and 105, the adjacent brine return line 23 or the brine injection line 22 may be used to inject an additional brine phase 15 through the well head 21. The brine injection may be used to equalize pressures at different steps of the sequence methods, for example between the flow line 11 and the discharge of the pump 10. The brine injection may also be used to repressurized some section of the flowlines, typically directed towards the separation vessel 1, when the pressure inside the separation vessel 1 has reached the lower pressure limit set between 0 psi and 10 psi [0 MPa and 0.07 MPa]. The brine injection may also be used to add a brine phase 15 inside the storage containment volume 52 of the underground storage 24, and therefore push further the hydrocarbon fluid phase 14, possibly left within the fluid mixture 9. One goal may be to recover most of the hydrocarbon fluid phase 14 as possible.

At the end of the sequence described in FIG. 3, the hydrocarbon fluid collection volume 33 may be filled with the wished volume of the hydrocarbon fluid phase 14, while the brine collection volume 34 may be filled with the wished volume of brine phase 15. The purge tank 28 may be used at the start or at the end of the sequence described in FIG. 3 to commission and remove any contaminants from the different flowlines 11, 8, 4, 16, 17, 31, 32, 35, 36, 23 by injecting a flush media.

FIG. 4 depicts a flowchart method, related to the flow schematic described in FIG. 2. The flowchart of FIG. 4 differs from the flowchart of FIG. 3 mainly due to the use of two pumps 10a and 10b instead of only one pump 10 in FIG. 1 and FIG. 3. The pump 10a may be associated with flowing the hydrocarbon fluid phase 14, while the pump 10b may be associated with the flowing the brine phase 15.

Step 111 may be a mirror of step 101 of FIG. 3. In general, similar operation and technique may be performed when fulfilling step 111 compared to step 101.

In step 112, having the starting condition of the step 111, the hydrocarbon fluid phase 14 may be flown out of the separation vessel 1, using the vessel top connection 2. The displacement of the hydrocarbon fluid phase 14 may be induced by the pump 10a, having the suction inlet connection 30a open to allow the displacement of the hydrocarbon fluid phase 14 through the hydrocarbon fluid flowline 16. The discharge of the pump 10a may be connected with the hydrocarbon fluid output flowline 31 which may be linked to the adjacent hydrocarbon fluid return line 4 and a hydrocarbon fluid return flowline 36, through the adjoining hydrocarbon fluid section connection valve 6. Further, the hydrocarbon fluid phase 14 may be saved and separated within the hydrocarbon fluid phase collection volume 33. Through this step 112, the hydrocarbon fluid phase 14 may be valued and reused for future occasions, while being separated from the brine phase 15.

Also mentioned in step 112, the flow-out of the hydrocarbon fluid phase 14, from the separation vessel through the pump 10, may modify the starting hydrocarbon to brine ratio by decreasing it. The hydrocarbon to brine ratio may decrease with time as the fluid mixture entering and flowing through the separation vessel 1 will be a mix of both phases 14 and 15. Therefore, while flowing out nearly exclusively the hydrocarbon fluid phase 14 through the pump 10a, the flow entry of the separation vessel 1 will include both phases 14 and 15, though the flowline 11. Furthermore, the hydrocarbon to brine ratio within the storage containment volume 52 may also evolve with time, as the least dense phase represented by the hydrocarbon fluid phase 14 may tend to decrease with time allowing a higher proportion of brine phase 15 to replace the hydrocarbon fluid phase 14.

Step 113 may be a continuation of step 112, whereby the hydrocarbon to brine ratio within the separation vessel will decrease with time to reach a value between 0.1 and 0.4. This means that the volume of the brine phase 15 represents between 60% and 90% of the whole volume of the separation vessel 1. When a predetermined hydrocarbon to brine ratio has been reached within the separation vessel, typically between 0.1 and 0.4, the operation continues by closing the valve of the drawdown section connection 5. Closing drawdown section connection 5 allows stopping the flow of fluid mixture 9 through the flowline 11.

Step 114 may be a continuation of step 113, by keeping the flow out of the hydrocarbon fluid phase 14 from the top connection 2 of the separation vessel 1 through the pump 10a, until the pressure within the separation vessel 1 has decreased to reach a predetermined limit. The pressure limit may be set between 0 psi and 10 psi [0 MPa and 0.07 MPa]. Practically, it would mean that when reaching this pressure limit, the pressure is no more sufficient to displace the hydrocarbon fluid phase 14 from the top connection 2 of the separation vessel 1.

Step 115 may be a continuation of step 114, by stopping the flow-out of the hydrocarbon fluid phase 14 from the vessel top connection 2 towards the pump 10a, when the pressure of the fluid mixture 9 within the separation vessel 1 has decreased to reach the pressure limit set between 0 psi and 10 psi [0 MPa and 0.07 MPa]. Practically, stopping the flow-out of the hydrocarbon fluid phase 14 from the vessel top connection 2 may occur by closing the vessel top connection 2 of the separation vessel 1. Furthermore, step 115 may include the start of flowing the brine phase 15 from the separation vessel bottom connection 3 towards the pump 10b. The pump suction inlet connection 30b may be allow the brine phase 15 flowing through the flow line 17. In addition, the adjoining brine section connection valve 27 may be open, while the adjoining hydrocarbon fluid section connection valve 6 may be closed. Therefore, the separation vessel 1 may be emptied from the remaining brine phase 15, which was left at the end of step 113 or 114.

Step 116 may be a back loop to repeat in sequence the steps 112, 113, 114 and 115 multiple times.

At any time during the sequence steps 112, 113, 114 and 115, the adjacent brine return line 23 or the brine injection line 22 may be used to inject an additional brine phase 15 through the well head 21. The brine injection may be used to equalize pressures at different steps of the sequence methods, for example between the flow line 11 and the discharge of the pumps 10a and 10b. The brine injection may also be used to repressurized some section of the flowlines, typically directed towards the separation vessel 1, when the pressure inside the separation vessel 1 has reached the lower pressure limit set between 0 psi and 10 psi [0 MPa and 0.07 MPa]. The brine injection may also be used to add a brine phase 15 inside the storage containment volume 52 of the underground storage 24, and therefore push further the hydrocarbon fluid phase 14, possibly left within the fluid mixture 9. One goal may be to recover most of the hydrocarbon fluid phase 14 as possible.

At the end of the sequence described in FIG. 4, the hydrocarbon fluid collection volume 33 may be filled with the wished volume of the hydrocarbon fluid phase 14, while the brine collection volume 34 may be filled with the wished volume of brine phase 15. The purge tank 28 may be used at the start or at the end of the sequence described in FIG. 4 to commission and remove any contaminants from the different flowlines 11, 8, 4, 16, 17, 31, 32, 35, 36, 23 by injecting a flush media.

As depicted in FIG. 1 and FIG. 2, the separation vessel 1 may include a level indicator 60. The level indicator 60 may indicate visually the position of the level 13, showing the interface between the brine phase 15 and the hydrocarbon fluid phase 14. The level indicator 60 may correspond to the position of a floater linked to the brine phase upper surface present inside the separation vessel 1. At the position of the level indicator 60, a level controller may also be present within the separation vessel 1. The level controller may include a sensing unit able determine the level 13 and indicate the amount of the brine phase 15 as well as of the hydrocarbon fluid phase 14, within the separation vessel 1. The level controller may be linked to a float gauge as well as to other types of ultrasonic or pressure measurement to determine the level 13. The level controller may be connected to an electronic recorder or converter, which may convert the physical level 13 in a digital or electronic form. The electronic recorder may itself be linked to a feedback connection which may communicate for example with the pump 10, as in FIG. 1, or with the pumps 10a and 10b, as in FIG. 2, or adjust the position of various connections such as 2, 3, 5, 30, 30a, 30b, 6 and 27. The feedback connection may have the form of a wire connection or a wireless connection.

Figure 5:
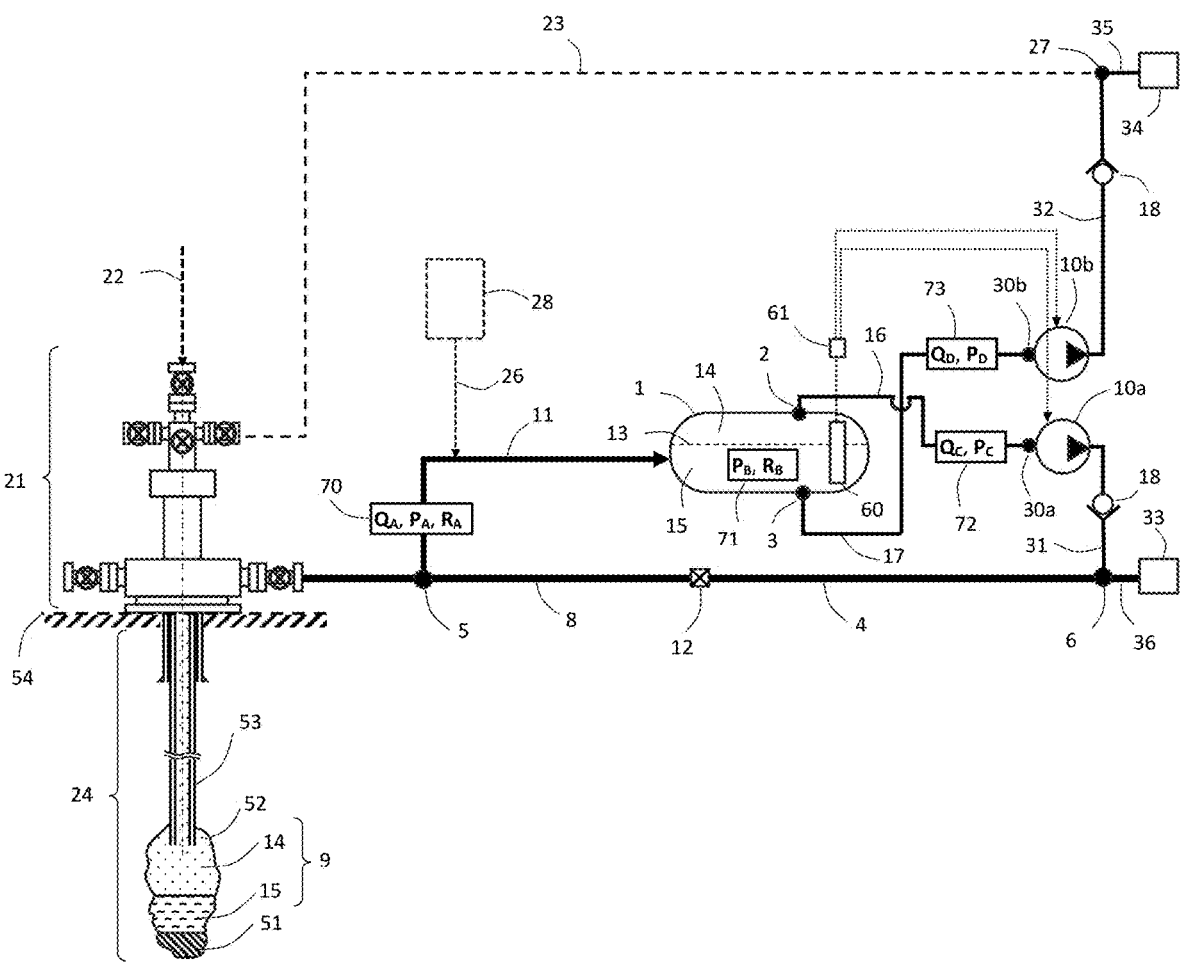
FIG. 5 represents a schematic of the components and connections as depicted on FIG. 2 with possible sensors, parameters and connection for a method regulation control.

FIG. 5 represents the component schematic of FIG. 2 with possible sensors, parameters for the method regulation control.

The level indicator 60, as depicted in FIG. 1 and FIG. 2, may be linked to control system 61. The control system 61 may receive various sensed parameters as further described in the specification and may control directly or indirectly the control system of the pumps 10a or 10b, as well as the opening/closing position of the various valve connections, namely 2, 3, 5, 30a, 30b, 6 and 27.

Parameters 70 represent the variables which may be significant for the flow section 11, between the underground storage 24 and the separation vessel 1. Parameters 70 may be described as following:

$Q_A$ would represent the flowrate of the fluid mixture 9 including the brine phase 15 and the hydrocarbon fluid phase 14, further present within the separation vessel 1.

$P_A$ would represent the pressure fluid mixture 9 within the flow section 11.

$R_A$ would represent the hydrocarbon to brine ratio within the fluid mixture 9 flowing inside the flow section 11. A $R_A$ of 1 would mean a full hydrocarbon fluid phase, and a $R_A$ of 0 would mean a full brine phase.

Parameters 71 represent the variables which may be significant within the separation vessel 1. Parameters 31 may be described as the following:

$P_B$ would represent the pressure fluid mixture 9 within the separation vessel 1. Standard $P_B$ pressure would typically be close to the pressure $P_A$.

$R_B$ would represent the hydrocarbon to brine ratio within the separation vessel 1. A $R_B$ of 1 would mean a full hydrocarbon fluid phase, and a $R_B$ of 0 would mean a full brine phase. The ratio $R_B$ would relate directly to the level 13 within the separation vessel 1. The ratio $R_B$ could be derived from the level indicator 50 or the level controller, as described in FIG. 1 and FIG. 2.

Parameters 72 represent the variables which may be significant for the hydrocarbon fluid flowline 16, between the top connection 2 of the separation vessel 1 and the pump 10a. Parameters 32 may be described as the following:

$Q_C$ would represent the flowrate of the hydrocarbon fluid phase flowing inside the hydrocarbon fluid flowline 16.

$P_C$ would represent the pressure of the hydrocarbon fluid phase within hydrocarbon fluid flowline 16.

Parameters 73 represent the variables which may be significant for the brine flowline 17, between the bottom connection 3 of the separation vessel 1 and the pump 10b. Parameters 33 may be described as the following:

$Q_C$ would represent the flowrate of the brine phase flowing inside the brine flowline 17.

$P_C$ would represent the pressure of the brine phase within brine flowline 17.

Figure 6:
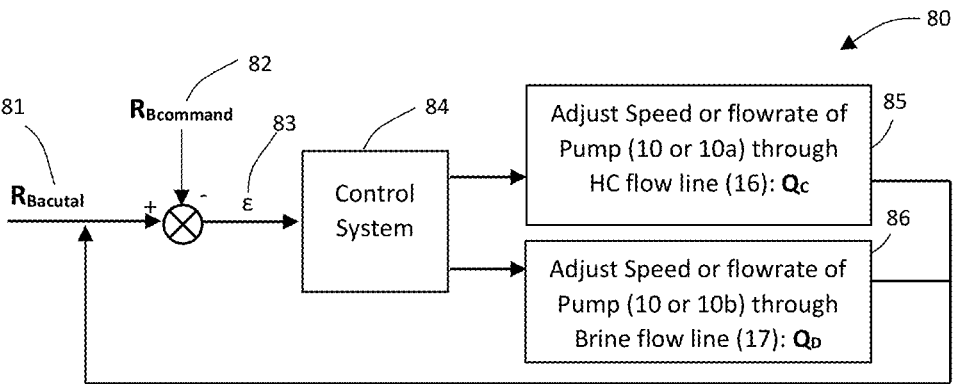
FIG. 6 represents a possible regulation flow diagram linked with the proposed invention.

FIG. 6 represents a regulation flow diagram as a part of the proposed invention.

A primary goal of the regulation method, represented as a regulation loop 80 in FIG. 6, as steady mode, includes regulating $R_B$, or the hydrocarbon to brine ratio within the separation vessel 1.

$R_{Bactual}$ 81 would represent an input or actual measured ratio or level inside the separation vessel 1. $R_{Bcommand}$ 82 would represent a target ratio or level considered as a command. $R_{Bcommand}$ could include a wished ratio, typically between 0.1 to 0.4, as well as a $R_{Bmin}$, representing the minimum ratio for an optimum operation, and a $R_{Bmax}$, representing the maximum ratio for an optimum operation. A typical $R_{Bmin}$ value may be between 0.05 and 0.15. A typical $R_{Bmax}$ value may be between 0.3 and 0.5. The consequence of the $R_B$ regulation may be to maintain $P_A$ above a predetermined limit. As described in the sequences of FIG. 3 and FIG. 4, the predetermined pressure limit for $P_A$ could be set between 0 psi and 10 psi [0 MPa and 0.07 MPa]. The difference between $R_{Bactual}$ 81 and $R_{Bcommand}$ 82 would be calculated as the regulation difference & 83. A typical goal of the regulation loop 80 may be to keep the regulation difference & 83 as small as possible or within predetermined limits corresponding to the minimum and maximum wished ratio $R_{Bmin}$ and $R_{Bmax}$.

The regulation loop may include $R_{Bactual}$ 81 as input. A first output action 85 may be the adjustment of the speed or flow output of the pump 10a, which may directly influence $Q_C$. A second output action 86 may be the adjustment of the speed or flow output of the pump 10b which may directly influence $Q_D$.

The regulation loop 80 may be controlled by a control system 84 performing at a predetermined frequency, either manual or automatic, typically between once every 1 second to once every 10 hours.

The control system 84 may also control the opening/closing position of the valve connections, which may have an influence on the various pressures and flowrates within the flow system, namely $P_A$, $Q_A$, $P_B$, $Q_C$, $P_C$, $Q_D$, $P_D$. The valves which may be part of the regulation system includes the drawdown section connection 5, the adjoining hydrocarbon fluid section connection valve 6, the vessel top connection 2, the vessel bottom connection 3, the pump suction inlet connections 30a and 30b, and the adjoining brine section connection valve 27.

Other regimes may also be part of the regulation loop 80, with additional output and specific actions. Other regimes may include a start regime or an end regime. Example of a start regime, which may be performed as part of the process, may include the removal of contaminates such as air, nitrogen within the separation vessel 1. Other start regimes may include the purge of the flowlines 8, 11, 4, 23.

What is claimed is:

1. A method to evacuate a fluid mixture from an underground storage location comprising:

flowing the fluid mixture from the underground storage location towards a separation vessel, wherein the fluid mixture contains a hydrocarbon fluid phase and a brine phase, wherein the separation vessel is located next or above a ground level, wherein the fluid mixture, contained in the underground storage location, is pressurized at a pressure higher than a pressure of the fluid mixture contained within the separation vessel, separating the fluid mixture in the hydrocarbon fluid phase and the brine phase, inside the separation vessel, pumping each phase of the fluid mixture from the separation vessel, through a single pump, towards dedicated containment volumes, wherein the dedicated containment volumes comprise a first containment volume configured to receive the hydrocarbon fluid phase and a second containment volume configured to receive the brine phase.

2. The method of claim 1, wherein the hydrocarbon fluid phase includes hydrocarbon in a liquid or gas form, wherein the brine phase includes a mixture of water and dissolved salt or chemical, wherein a mass density of the hydrocarbon fluid phase is smaller than a mass density of the brine phase, wherein the hydrocarbon fluid phase and the brine phase are not miscible.

3. The method of claim 2, wherein the hydrocarbon fluid phase and the brine phase are delimited by an interface level inside the separation vessel, wherein the hydrocarbon fluid phase is located above the interface level, wherein the brine phase is located below the interface level, wherein a proportion of hydrocarbon fluid phase over the brine phase, within the separation vessel, corresponds to a hydrocarbon to brine ratio, wherein a hydrocarbon to brine ratio of 1 corresponds to a volume of the separation vessel filled 100% with the hydrocarbon fluid phase, wherein a hydrocarbon to brine ratio of 0 corresponds to the volume of the separation vessel filled 100% with the brine phase.

4. The method of claim 3, wherein flowing the fluid mixture from the underground storage location towards the separation vessel, before pumping each phase of the fluid mixture contained inside the separation vessel towards the dedicated containment volumes, using the single pump, occurs with an initial hydrocarbon to brine ratio which is above 0.9 inside the separation vessel.

5. The method of claim 4, wherein the initial hydrocarbon to brine ratio is decreasing from a ratio value above 0.9 and is reaching a ratio value between 0.1 and 0.4, during a first sequence of pumping each phase of the fluid mixture contained inside the separation vessel towards the dedicated containment volumes, using the single pump, wherein, during the first sequence of pumping, only the hydrocarbon fluid phase of the fluid mixture contained inside the separation vessel is pumped towards the dedicated containment volumes for the hydrocarbon fluid phase.

6. The method of claim 5, further comprising:

stopping a flow of the fluid mixture from the underground storage location towards the separation vessel, when the hydrocarbon to brine ratio has reached a ratio value between 0.1 and 0.4, continuing the pumping of the first sequence of pumping each phase of the fluid mixture contained inside the separation vessel towards the dedicated containment volumes, using the single pump, until the pressure within the separation vessel has reached a value between 0 and 10 psi [0 and 0.07 MPa].

7. The method of claim 6, further comprising:

starting a second sequence of pumping each phase of the fluid mixture contained inside the separation vessel towards dedicated containment volumes, using the single pump, when a pressure within the separation vessel has reached a value between 0 and 10 psi [0 and 0.07 MPa], wherein, during the second sequence of pumping, only the brine phase of the fluid mixture contained inside the separation vessel is pumped towards the second containment volume, wherein the second sequence of pumping is stopped when the brine volume remaining within the separation vessel is less than 10% of the overall volume of the separation vessel.

8. The method of claim 7 further comprising:

injecting brine fluid inside the fluid mixture which is remaining inside the underground storage location, wherein the injected brine fluid is pumped from a position above or next to the ground level, wherein the pressure within the underground storage location is increased, which in turn increases the pressure within the separation vessel above 10 psi [0.07 MPa], repeating following steps:

flowing the fluid mixture from the underground storage location towards the separation vessel, separating the fluid mixture in the hydrocarbon fluid phase and the brine phase, inside the separation vessel, pumping the first sequence of pumping, only with the hydrocarbon fluid phase of the fluid mixture contained inside the separation vessel, stopping the flow of the fluid mixture from the underground storage location towards the separation vessel, pumping the second sequence of pumping, only with the brine phase of the fluid mixture contained inside the separation vessel.

9. The method of claim 8, wherein adjusting the hydrocarbon to brine ratio, adjusting the pressure within the separation vessel, adjusting the interface level, inside the separation vessel, is achieved through a regulation method, wherein the regulation method is manual or automated.

10. The method of claim 8, wherein the dedicated containment volume for the hydrocarbon fluid phase connects to a hydrocarbon drawdown pipe section, wherein the hydrocarbon drawdown pipe section is linked through various connections and valves to the underground storage location, wherein, during an evacuation method, some of the various connections and valves are closed to isolate the dedicated containment volume for the hydrocarbon fluid phase from the fluid mixture contained within the underground storage location, wherein some of the various connections and valves are open during at least one of a plurality of specific operations, wherein the plurality of specific operations include maintenance, storage preparation, storage connection with other underground or aboveground storages, and storage displacement towards other underground or aboveground storage locations.

11. The method of claim 8, wherein the dedicated containment volume for the brine phase connects to an adjoining brine return pipe section, wherein the adjoining brine return pipe section is linked through various connections and valves to the underground storage location, wherein, during an evacuation method, some of the various connections and valves are closed to isolate the dedicated containment volume for the brine phase from the fluid mixture contained within the underground storage location, wherein some of the various connections and valves are open during at least one of a plurality of specific operations, wherein the plurality of specific operations include maintenance, storage preparation, storage connection with other underground or aboveground storages, storage displacement towards other underground or aboveground storage locations.

12. The method of claim 9, wherein the regulation method achieves maintaining the hydrocarbon to brine ratio inside the separation vessel at a wished level, or between a minimum or a maximum level, wherein the separation vessel includes a level indicator or a level controller, wherein the level indicator or the level controller allows determining the position of the interface level.

13. The method of claim 1, further comprising injecting a purge fluid inside the separation vessel, wherein the purge fluid includes at least one of fresh water, nitrogen gas, and air.

14. The method of claim 1, wherein each phase of the fluid mixture is pumped from the separation vessel, through the single pump, towards the dedicated containment volumes simultaneously.

* * * * *